United States Patent Office 3,143,570
Patented Aug. 4, 1964

3,143,570
METHOD FOR PREPARING ALICYCLIC DIAMINES
John R. Caldwell and James E. Poe, Kingsport, Tenn., assignors to Eastman Kodak Company, Rochester, N.Y., a corporation of New Jersey
No Drawing. Filed July 1, 1960, Ser. No. 40,153
7 Claims. (Cl. 260—563)

This invention relates to the preparation of cycloaliphatic diamines. More particularly, it relates to the manufacture of cycloaliphatic diamines by the hydrogenation of alicyclic cyanoaldehydes.

Cycloaliphatic diamines are known as starting materials in the preparation of polymers such as those described in U.S. Patent 2,666,748 and in copending application of Caldwell and Martin, U.S. Serial No. 729,056 filed April 17, 1958, now U.S. 3,017,388 granted on January 16, 1962. Conventional methods for the preparation of alicyclic diamines by the ammonolysis of the diol have resulted in mixed and varied yields of the aminoalcohol, the diamine, and considerable unreacted diol.

It is accordingly an object of this invention to provide a novel method for the preparation of cycloaliphatic diamines.

It is another object of this invention to provide a method for the production of cycloaliphatic diamines which are useful in the preparation of film-forming polymers.

It is a further object of this invention to provide a novel and unobvious method for the preparation of cycloaliphatic diamines useful in the manufacture of film-forming polymer from alicyclic cyanoaldehydes.

These and other objects of this invention will be apparent from the description and claims which follow.

We have found that alicyclic cyanoaldehydes can be hydrogenated in the presence of ammonia to produce a high yield of the substantially pure diamine. The alicyclic cyanoaldehydes can be prepared by hydroformylation of the corresponding bicycloheptene or cyclohexene compound. For example, in the case of the cyanonorcamphane carboxaldehyde, bicyclo[2,2,1]hept-5-ene-3-carbonitrile can be treated with carbon monoxide and hydrogen in the presence of a cobalt carbonyl or other suitable hydroformylation catalyst, and in the case of the cyanocyclohexane carboxaldehyde, 3-cyclohexene-1-carbonitrile can be similarly treated. The 3-cyclohexene-1-carbonitrile can be prepared by the Diels-Alder type reaction between butadiene and acrylonitrile. The hydroformylation reaction can be carried out in the presence or absence of a solvent at temperatures of from about 90° C. to about 150° C. and at pressures of from about 1000 p.s.i. to about 4000 p.s.i. or greater.

Suitable catalysts for the reaction are carbonyl-forming metals of Group VIII of the periodic table and their compounds. The preferred catalysts are weak acid salts of cobalt, cobalt carbonyls, and finely divided metallic cobalt. The concentration of catalyst may vary between about 0.1% and 20% of the weight of the alicyclic cyanoaldehyde, the preferred range being from about 1% to about 5%.

In a preferred embodiment of this invention, the cyanoaldehyde is first treated with excess ammonia to form the Shiff's base, at which stage the $$-\overset{H}{C}=O$$

group has been changed to the $$-\overset{H}{C}=NH$$

group, and the Schiff's base after being isolated is then hydrogenated in ammonia. The cyanoaldehyde used in the practice of this invention can be either the cyclohexane derivative or the norcamphane derivative. In the former case, the compound preferred is substantially pure cyanocyclohexane-4-carboxaldehyde, which has the formula:

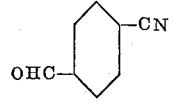

and in the latter case, substantially pure 2-cyanonorcamphane-5-carboxaldehyde, which has the formula:

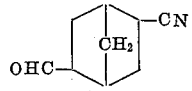

It is not necessary that these be the only isomers used. A crude cyclohexane cyanoaldehyde compound containing some of the 1,3-cyclohexane isomer or a crude norcamphane cyanoaldehyde compound containing some of the 2,6-norcamphane isomer can also be used as the starting material, or the 1,3-cyclohexane isomer and the 2,6-norcamphane isomer can be reduced separately to the corresponding diamines. We are unable to explain the reason for the surprisingly increased yield of the diamine in this embodiment of our invention. However, we hypothesize that by the isolation of the Schiff's base as an intermediate, the formation of substantial amounts of the hydroxymethyl derivative is prevented due to the substantial elimination of water from the system.

In an alternative embodiment of this invention, the cyanoaldehyde is hydrogenated in the presence of ammonia using Raney nickel, Raney cobalt or other suitable hydrogenation catalyst without the isolation of the Schiff's base intermediate.

In both of these embodiments, the catalysts can be any of the conventional hydrogenation catalysts. We have found that Raney nickel, Raney cobalt, nickel on a clay support, platinum, palladium, and ruthenium produce excellent conversion of the cyanoaldehyde to the diamine, Raney nickel and Raney cobalt producing particularly high yields of the diamine. In the preferred embodiment, wherein the Schiff's base is isolated as an intermediate, the ammonolysis of the cyanoaldehyde to the Schiff's base can be conducted at any temperature within the range of from about 0° C. to about 60° C., the preferable range being from about 10° C. to about 40° C. This operation can be carried out in a vacuum, at atmospheric pressure, or under compression. The Schiff's base can be made in benzene, toluene, or ether. In this particular embodiment, the hydrogenation step is carried out at a temperature from about 80° C. to about 150° C. The solvents used can be lower alcohols, dioxane, methoxy ethanol, or ethoxy ethanol, although we have found methyl alcohol to be especially effective as a solvent in the hydrogenation step.

The following examples are illustrative of our invention but are not intended to be limiting in any way.

*Example 1.—Preparation of Cyanonorcamphanecarboxaldehyde*

A solution of 476 g. (4 moles) of bicyclo[2,2,1]hept-5-ene-2-carbonitrile in 2000 ml. of dry benzene was placed in an autoclave with 30 grams of cobalt carbonyl. The system was purged with hydrogen, the pressure was increased to 800 p.s.i. with hydrogen, and then carbon monoxide and hydrogen were charged to 2000 p.s.i. The autoclave was heated to 140° C., and mixed carbon monoxide and hydrogen were added at 3000 p.s.i. until the reaction stopped. The reaction mixture was immediately distilled to separate the product from the catalyst, yielding 408 g. (68%) of crude cyanoaldehyde boiling from 110–115° C. at 3 mm. Hg pressure. This was carefully fractionated to yield two fractions, Fraction A consisting of 85 g. of 6-cyanonorcamphane-2-carboxaldehyde having a boiling point of 110–120° C. at 4.2–4.0 mm. Hg and a refractive index ($n_D^{20}$) of 1.4934 and Fraction B consisting of 260 g. of 5-cyanonorcamphane-2-carboxaldehyde having a boiling point of 120–128° C. at 4.0 mm. Hg and a refractive index ($n_D^{20}$) of 1.4951.

*Example 2.—Preparation of Cyanocyclohexane-carboxaldehyde*

A solution of 214 g. (2 moles) of 3-cyclohexene-1-carbonitrile and 10 g. of hydroquinone in 600 ml. of benzene was placed in a 1680-ml. stainless steel rocking autoclave which was purged with hydrogen, then charged to 800 p.s.i. with hydrogen, then with a 1:1 mixture of carbon monoxide and hydrogen to a total pressure of 2000 p.s.i. The autoclave was then heated to 130° C. and sufficient carbon monoxide-hydrogen mixture added to maintain the pressure at 3000 p.s.i. until the reaction ceased. The reaction mixture was removed from the autoclave and the cyanocyclohexanecarboxaldehyde product collected by fractional distillation. The crude product consisted principally of the 4-isomer, but a small amount of the 3-isomer was also present. The two isomers were separated by further fractional distillation.

*Example 3.—Preparation of Norcamphanebis(Methylamine) by the One-Step Reduction of Cyanonorcamphanecarboxaldehyde*

149 g. of crude cyanonorcamphanecarboxaldehyde prepared according to the procedure of Example 1 were placed in an autoclave with 500 ml. of methanol, 170 g. ammonia, and 20 g. of Raney nickel. Hydrogen was introduced until a pressure of 3000 p.s.i. was established, and the autoclave was heated to 94° C. The reaction was complete in 4–5 hours. Distillation of the product gave a 46% yield of 69 g. of a diamine having a boiling point of 119–120° C. at a pressure of 10 mm. Hg. The neutral equivalent was found to be 78.7 compared to a theoretical value of 77. The diamine consisted of a mixture of the 2,5 and 2,6 isomers of norcamphanebis(methylamine).

*Example 4.—Preparation of Norcamphanebis(Methylamine) From Cyanonorcamphanecarboxaldehyde With the Isolation of Schiff's Base Intermediate*

149 g. of crude cyanonorcamphanecarboxaldehyde prepared according to the procedure of Example 1 were dissolved in 300 g. of benzene, and ammonia gas was bubbled in. The heat of reaction was removed by cooling the vessel in water. A lower layer of water and ammonium hydroxide was formed. The mixture was heated at 40° C., and a vacuum was applied. The water was removed as an azeotrope. The benzene was then removed by further heating in vacuum. The residual Schiff's base was dissolved in 500 cc. of methyl alcohol, and the solution was placed in an autoclave. 20 g. of alcoholic Raney nickel and 170 g. of ammonia were added to the autoclave, and a hydrogen pressure of 3000 p.s.i. was established. Reduction was complete in 3 hours at 92° C. Distillation of the product gave an 83% yield of 127 g. of norcamphanebis(methylamine) having a boiling point of 103° at a pressure of 3.3 mm. Hg and a refractive index ($n_D^{20}$) of 1.5107. The 2,5-isomer was the main component of the norcamphanebis(methylamine).

*Example 5.—Preparation of Cyclohexanebis(Methylamine) by the One-Step Reduction of Cyanocyclohexane-4-Carboxaldehyde*

66 g. of cyanocyclohexane-4-carboxaldehyde, 85 g. of ammonia, 10 g. of Raney nickel, and 250 ml. of methyl alcohol were placed in an autoclave, and a hydrogen pressure of 3000 p.s.i. was introduced. Reduction was complete in 3–4 hours at 95–100°. The yield of cyclohexanebis(methylamine) was 30–40% by this single-step process.

*Example 6.—Preparation of 1,4-Cyclohexanebis(Methylamine) From Cyanocyclohexane-4-Carboxaldehyde With the Isolation of Schiff's Base Intermediate*

66 g. of cyanocyclohexane-4-carboxaldehyde were added dropwise to 500 ml. of concentrated ammonium hydroxide solution cooled in an ice bath. A crystalline precipitate of the Schiff's base was formed. It was filtered and dried in a vacuum. The Schiff's base was dissolved in 250 ml. of methyl alcohol and the solution was placed in an autoclave. Ten grams of alcoholic Raney nickel and 85 g. of ammonia were added and a hydrogen pressure of 3000 p.s.i. was introduced. Reduction was complete in 3 hours at 95–100°. Distillation of the product gave an 85% yield of 56 g. of 1,4-cyclohexanebis(methylamine), boiling at 106–111° C. at 10 mm., and a refractive index ($n_D^{20}$) of 1.4941.

*Example 7.—Preparation of 1,3-Cyclohexanebis(Methylamine) From Cyanocyclohexane-3-Carboxaldehyde With Isolation of Schiff's Base Intermediate*

66 g. of cyanocyclohexane-3-carboxaldehyde were treated with ammonia and the Schiff's base, after isolation, hydrogenated. The procedure of Example 6 was followed. A yield of 85% 1,3-cyclohexanebis(methylamine) was obtained.

*Example 8.—Preparation of Cyclohexanebis(Methylamine) by the One-Step Reduction of Crude Cyanocyclohexanecarboxaldehyde*

About 70 g. of crude cyanocyclohexanecarboxaldehyde prepared according to the procedure of Example 2 were treated with ammonia and hydrogen in accordance with the procedure of Example 5. A 30% yield of cyclohexanebismethylamine containing a mixture of the 1,4- and 1,3- isomers was obtained.

*Example 9.—Preparation of 1,4-Cyclohexanebis(Methylamine) From Crude Cyanocyclohexanecarboxaldehyde With Isolation of Schiff's Base Intermediate*

About 65 g. of crude cyanocyclohexanecarboxaldehyde prepared according to the procedure of Example 2 were converted to the Schiff's base and then to cyclohexanebismethylamine) in accordance with the procedure of Example 6. An 80% yield of a mixed isomer product consisting of a major amount of 1,4-cyclohexanebis(methylamine) and a minor amount of 1,3-cyclohexanebis(methylamine) was obtained.

The following example is given to illustrate the surprising superiority of the method for the production of cycloaliphatic diamines of this invention over a method of preparation from 1,4-cyclohexanediomethanol.

*Example 10.—Preparation of 1,4-Cyclohexanebis(Methylamine) From 1,4-Cyclohexanedimethanol*

A 60-gal. autoclave was purged thoroughly with nitrogen and then charged with 110 lb. of 1,4-cyclohexanedimethanol and 3 lb. of Raney nickel. Then 55 lb. of anhydrous ammonia was charged to the autoclave, and the mixture was stirred and heated by means of a high pressure steam coil at 225° C. for 6 hrs. The charge was cooled to 60° C., and the excess ammonia pressure was vented into a barrel of water prior to discharging the vessel into a drum. Four such runs were made and combined. The catalyst was then filtered out and the product was distilled by fractional distillation at reduced pressure, and the following products were recovered.

55.6 lb. of water
8.6 lb. of unidentified products
140 lb. of cyclohexanebismethylamine, B.P. 155–160° C./50 mm. Hg
144 lb. 4-aminomethylcyclohexanemthanol, B.P. 182–192° C./50 mm. Hg
31 lb. 1,4-cyclohexanedimethanol
66 lb. residue This represents a yield of 38.7% of 1,4-cyclohexanebis-(methylamine) and 40% of 4-aminomethylcyclohexanemethanol.

The preceding examples demonstrate the novelty, utility, and unobviousness of our method of the hydrogenation of alicyclic cyanoaldehydes in the presence of ammonia for the preparation of cycloaliphatic diamines useful in the production of polyamide fibers.

Although the invention has been described in considerable detail with reference to certain preferred embodiments thereof, it will be understood that variations and modifications can be effected within the spirit and scope of the invention as described hereinabove and as defined by the appended claims.

We claim:

1. A process for the preparation of cycloaliphatic diamines which comprises forming a solution consisting essentially of ammonia and a cyano-methyleneimino compound selected from the group consisting of cyanocyclohexanemethyleneimine and cyanonorcamphanemethyleneimine in an inert organic solvent selected from the group consisting of the lower alcohols, dioxane, methoxy ethanol, and ethoxy ethanol, hydrogenating said cyano-methyleneimino compound at a temperature of from about 80° C. to about 150° C. and at a hydrogen pressure of at least about 500 p.s.i. in the presence of a catalyst selected from the group consisting of Raney nickel, Raney cobalt, nickel supported on clay, platinum, palladium, and ruthenium, whereby substantially all of said cyano-methyleneimino compound is converted to the corresponding diamine.

2. The process for the preparation of cycloaliphatic diamines according to claim 1 wherein the compound dissolved in the organic solvent is cyanocyclohexanemethyleneimine.

3. The process for the preparation of cycloaliphatic diamines according to claim 1, wherein the compound dissolved in the organic solvent is cyanonorcamphanemethyleneimine.

4. A process as defined by claim 1, wherein the catalyst is Raney nickel.

5. A process as defined by claim 4, wherein the solvent is methyl alcohol.

6. A process as defined by claim 5, wherein the compound dissolved in methyl alcohol is cyanocyclohexanemethyleneimine.

7. A process as defined by claim 5, wherein the compound dissolved in methyl alcohol is cyanonorcamphanemethyleneimine.

References Cited in the file of this patent

UNITED STATES PATENTS

| | | |
|---|---|---|
| 2,278,372 | Olin | Mar. 31, 1942 |
| 2,636,051 | Whetstone et al. | Apr. 21, 1953 |
| 2,818,431 | Beegle | Dec. 31, 1957 |
| 2,852,560 | Brust | Sept. 16, 1958 |
| 2,894,038 | Bartlett et al. | July 7, 1959 |
| 3,012,994 | Bell et al. | Dec. 12, 1961 |

FOREIGN PATENTS

| | | |
|---|---|---|
| 785,108 | Great Britain | Oct. 23, 1957 |

OTHER REFERENCES

Winans: J.A.C.S., vol. 61, pages 3566–3567 (1939).
Takagi et al.: C.A., vol. 33, col. 536–537(1939).
Natto et al.: J.A.C.S., vol. 76, pages 4049–4050 (1954).